(12) United States Patent
Yang et al.

(10) Patent No.: US 12,077,632 B2
(45) Date of Patent: Sep. 3, 2024

(54) WATERBORNE EPOXY RESIN FOR ANTI-CORROSION COATING, AND PREPARATION METHOD AND USE THEREOF

(71) Applicants: State Grid Liaoning Shenyang Electric Power Supply Company, Liaoning (CN); State Grid Corporation of China, Beijing (CN)

(72) Inventors: Changlong Yang, Liaoning (CN); Mingjie Ju, Shanghai (CN); Bo Hu, Liaoning (CN); Shuwen Zheng, Liaoning (CN); Yuansheng Ma, Liaoning (CN); Yang Zheng, Liaoning (CN); Dazhong Wang, Liaoning (CN); Junlong Duo, Liaoning (CN); Rongzhen Xia, Liaoning (CN)

(73) Assignees: State Grid Liaoning Shenyang Electric Power Supply Company, Shenyang (CN); State Grid Corporation of China, Beijing (CN)

( * ) Notice: Subject to any disclaimer, the term of this patent is extended or adjusted under 35 U.S.C. 154(b) by 320 days.

(21) Appl. No.: 17/614,515

(22) PCT Filed: Sep. 17, 2021

(86) PCT No.: PCT/CN2021/119101
§ 371 (c)(1),
(2) Date: Nov. 27, 2021

(87) PCT Pub. No.: WO2022/151754
PCT Pub. Date: Jul. 21, 2022

(65) Prior Publication Data
US 2023/0159694 A1    May 25, 2023

(30) Foreign Application Priority Data

Jan. 13, 2021 (CN) .......................... 202110039570.1

(51) Int. Cl.
| | | |
|---|---|---|
| *C08G 59/22* | (2006.01) | |
| *C08G 59/14* | (2006.01) | |
| *C08G 59/40* | (2006.01) | |
| *C08G 59/50* | (2006.01) | |
| *C09D 5/08* | (2006.01) | |
| *C09D 163/00* | (2006.01) | |

(52) U.S. Cl.
CPC ......... *C08G 59/22* (2013.01); *C08G 59/1477* (2013.01); *C08G 59/50* (2013.01); *C09D 5/08* (2013.01); *C09D 163/00* (2013.01); *C08G 2150/90* (2013.01)

(58) Field of Classification Search
None
See application file for complete search history.

(56) References Cited

FOREIGN PATENT DOCUMENTS

| | | | | |
|---|---|---|---|---|
| CN | 110845703 A | 2/2020 | | |
| CN | 111040191 A | 4/2020 | | |
| CN | 111533881 A | 8/2020 | | |
| CN | 112062937 A | * 12/2020 | ............. | C08G 59/20 |
| JP | 2016160567 A | * 9/2016 | | |
| WO | WO-2012165055 A1 | * 12/2012 | ............. | C08G 18/58 |

OTHER PUBLICATIONS

Qirong Kuang, Research on the Synthesis and Performance of Non-iron Self-emulsifying Waterborne Phenolic Epoxy Resin, Chinese Master's Theses Full-text Database, Engineering Science and Technology I, Apr. 15, 2014, vol. 4, B018-10.

* cited by examiner

*Primary Examiner* — Randy P Gulakowski
*Assistant Examiner* — Ha S Nguyen

(57) ABSTRACT

The present disclosure discloses a waterborne epoxy resin for an anti-corrosion coating, and a preparation method and use thereof. In the preparation method, a strongly-hydrophilic polyethylene glycol (PEG) branch is introduced into a molecular chain of epoxy resin to realize the self-emulsification function of epoxy resin. Moreover, due to the short molecular chain, a solid content can reach up to 66.7% under the action of PEG. In addition, the waterborne emulsion can be prepared without adding any additional alcohol-soluble solvents and other high-boiling-point organic solvents, and a production process and a product use process both are very environmentally friendly. The waterborne epoxy resin can be mixed with a waterborne ammonia curing agent to form a film for corrosion protection.

8 Claims, No Drawings

WATERBORNE EPOXY RESIN FOR ANTI-CORROSION COATING, AND PREPARATION METHOD AND USE THEREOF

TECHNICAL FIELD

The present disclosure relates to the technical field of polymer synthesis and waterborne emulsion preparation, and in particular to a waterborne epoxy resin, and a preparation method and use thereof.

BACKGROUND

Waterborne polyurethane is a polyurethane (PU) system in which water is used instead of an organic solvent to serve as a dispersion medium. Waterborne polyurethane is widely used in environmentally friendly coatings, adhesives, printing inks, and the like, and has advantages such as no pollution, safety, and excellent mechanical properties. However, existing industrial products also have problems such as low solid content, long surface drying time, and addition of high-boiling-point organic solvents such as N-methylpyrrolidone (NMP). In order to increase the solid content and solve the NMP residue problem, Chinese patent CN202010533710.6 proposes the use of an aliphatic isocyanate and a polycaprolactone diol (PCL-diol) as raw materials and dimethylolpropionic acid (DMPA) that shows high compatibility with PCL as a solvent instead of NMP to prepare waterborne polyurethane, and finally a waterborne polyurethane emulsion with a solid content of 45% to 48% is obtained. However, aliphatic isocyanates are significantly more expensive than aromatic isocyanates and PCL-diols are significantly more expensive than other polymer diols, which is not conducive to industrialization and large-scale use.

An epoxy resin molecular chain does not include hydrophilic groups and does not have the function of self-emulsification, and thus in most cases, an emulsifying agent is additionally added for emulsification and dispersion. For example, in Chinese patents CN201911032050.7 and CN201911358464.9, an emulsifying agent and a solvent are additionally added to realize the emulsification of an epoxy resin. This method will cause an emulsifying agent and a solvent (partially) residue in a paint film during the film formation of an emulsion, which has an impact on the mechanical properties and environmental protection performance of the film.

Therefore, it has become an urgent problem to develop a preparation method of a waterborne epoxy resin, which can maintain the environmental protection of a film without affecting the mechanical properties of the film.

SUMMARY OF THE INVENTION

In view of this, the present disclosure provides a waterborne epoxy resin for an anti-corrosion coating, and a preparation method and use thereof. The present disclosure solves the problem that an epoxy resin can only be emulsified and dispersed by adding an emulsifying agent traditionally, which is not environmentally friendly and will affect the mechanical properties of a film.

In one aspect, the present disclosure provides a preparation method of a waterborne epoxy resin for an anti-corrosion coating, including the following steps:

S1: performing an epoxy ring-opening reaction to an epoxy resin to prepare a hydroxyl-containing epoxy resin oligomer using carboxylated methoxy polyethylene glycol;

S2: subjecting the hydroxyl-containing epoxy resin oligomer and an isocyanate to an end-capping reaction to obtain a urethane-containing epoxy resin; and S3: adding deionized water to the urethane-containing epoxy resin, and stirring to obtain a waterborne epoxy resin emulsion.

Preferably, the carboxylated methoxy polyethylene glycol may have a molecular weight of 200 g/mol to 1,000 g/mol.

Further preferably, the epoxy resin may be one selected from the group consisting of ethylene glycol diglycidyl ether, propylene glycol diglycidyl ether, 1,4-butanediol diglycidyl ether, pentanediol diglycidyl ether, 1,6-hexanediol diglycidyl ether, bisphenol A diglycidyl ether, poly(ethylene glycol) diglycidyl ether, and poly(propylene glycol) diglycidyl ether.

Further preferably, the isocyanate may be one selected from the group consisting of diphenylmethane diisocyanate, polymeric diphenylmethane diisocyanate, toluene diisocyanate, isophorone diisocyanate, dicyclohexyl methane diisocyanate, hexamethylene diisocyanate, and hexamethylene diisocyanate trimer.

Further preferably, in S1, the ring-opening reaction may be conducted at 120° C. for 2 h.

Further preferably, in S2, the end-capping reaction may be conducted at 25° C. to 80° C. for 0.5 h to 4 h.

Further preferably, in S3, a weight ratio of the deionized water to the urethane-containing epoxy resin may be (0.5-2):1.

Further preferably, in S3, the stirring may be conducted at 1,000 r/min to 2,000 r/min for 10 min to 30 min.

In another aspect, the present disclosure also provides a waterborne epoxy resin for an anti-corrosion coating prepared by the preparation method described above.

In addition, the present disclosure also provides use of the waterborne epoxy resin, and specifically, a waterborne ammonia curing agent is added to the waterborne epoxy resin to form a film for corrosion protection, where based on weight, the waterborne ammonia curing agent is 10% to 40% of the waterborne epoxy resin.

In the preparation method of the waterborne epoxy resin for an anti-corrosion coating provided by the present disclosure, a strongly-hydrophilic polyethylene glycol branch is introduced into a molecular chain of epoxy resin to realize the self-emulsification function of the epoxy resin. Moreover, due to the relatively shorter molecular chain of the epoxy resin, a solid content can reach up to 66.7% under the action of polyethylene glycol. In addition, the waterborne emulsion can be prepared without adding any additional alcohol solvents or other high-boiling-point organic solvents, and its production process and use procedures are both very environmentally friendly.

The preparation method of the waterborne epoxy resin for an anti-corrosion coating provided by the present disclosure has the following advantages:

1) Compared with a preparation process of a waterborne polyurethane emulsion, the preparation process of the present disclosure is shorter and involves significantly-lower energy consumption.

2) The waterborne epoxy resin prepared by the present disclosure has a high solid content, up to 66.7%.

3) The waterborne epoxy resin prepared by the present disclosure includes a large number of urethane groups, and thus under the crosslinking of epoxy groups, a cured product has excellent flexibility and impact resistance, and strong mechanical properties.

4) The waterborne epoxy resin prepared by the present disclosure has the function of self-emulsification, and thus there is no need to add high-boiling-point solvents such as NMP which are adopted in preparation of waterborne polyurethane for introducing carboxylate, nor need to add an additional emulsifying agent and an alcohol solvent as other waterborne epoxy resin preparation methods, which results in low volatile organic compound (VOC) content and prominent environmental protection effect.

It should be understood that the above general description and the following detailed description are only exemplary and explanatory, and should not be construed as a limitation to the present disclosure.

DETAILED DESCRIPTION OF ILLUSTRATED EXAMPLES

Exemplary examples are described in detail herein. The implementations described in the following exemplary examples do not represent all implementations consistent with the present disclosure. Instead, the implementations are merely examples of methods consistent with some aspects of the present disclosure as recited in the appended claims.

Since a molecular chain of an epoxy resin does not include hydrophilic groups and does not have the function of self-emulsification, an additional emulsifying agent has to be added at present to achieve the emulsification and dispersion of an epoxy resin before use, which causes environmental problems and affects the mechanical properties of a film. The present disclosure attempts to introduce a hydrophilic structure into a molecular chain of an epoxy resin to realize the self-emulsification of the epoxy resin without adding an additional emulsifying agent.

Specifically, the present disclosure provides a preparation method of a waterborne epoxy resin for an anti-corrosion coating, including the following steps:

S1: performing an epoxy ring-opening reaction to an epoxy resin using carboxylated methoxy polyethylene glycol to prepare a hydroxyl-containing epoxy resin oligomer;

S2: subjecting the hydroxyl-containing epoxy resin oligomer obtained in 51 and an isocyanate to an end-capping reaction to obtain a urethane-containing epoxy resin; and S3: adding deionized water to the urethane-containing epoxy resin obtained in S2, and stirring to obtain a waterborne epoxy resin emulsion.

The carboxylated methoxy polyethylene glycol may preferably have a molecular weight of 200 g/mol to 1,000 g/mol. The polymer prepared by above method with carboxylated methoxy polyethylene glycol in this molecular weight range has a self-emulsification function. Carboxylated methoxy polyethylene glycol in a larger molecular weight will affect the water resistance of the polymer, and the one in a smaller molecular weight will lead to insufficient self-emulsification such that the epoxy resin fails to be dispersed in water by itself.

The epoxy resin may be one selected from the group consisting of ethylene glycol diglycidyl ether, propylene glycol diglycidyl ether, 1,4-butanediol diglycidyl ether, pentanediol diglycidyl ether, 1,6-hexanediol diglycidyl ether, bisphenol A diglycidyl ether, poly(ethylene glycol) diglycidyl ether, and poly(propylene glycol) diglycidyl ether.

The isocyanate may be one selected from the group consisting of diphenylmethane diisocyanate, polymeric diphenylmethane diisocyanate, toluene diisocyanate, isophorone diisocyanate, dicyclohexyl methane diisocyanate, hexamethylene diisocyanate, and hexamethylene diisocyanate trimer.

In S1, the ring-opening reaction may be conducted at 120° C. for 2 h. In S2, the end-capping reaction may be conducted at 25° C. to 80° C. for 0.5 h to 4 h, where a temperature higher than 80° C. will easily lead to side reactions and a temperature lower than 25° C. will lead to a too long reaction time. In S3, a weight ratio of the deionized water to the urethane-containing epoxy resin may be (0.5-2):1, and a solid content of the emulsion may be generally controlled at 20% to 33%, where a too high solid content will lead to poor storage stability and a too low solid content will lead to too slow surface drying. In S3, the stirring may be conducted at 1,000 r/min to 2,000 r/min for 10 min to 30 min, where a too high stirring speed will make it difficult to realize industrial production and a too low stirring speed will produce a shear force insufficient to disperse the polymer in water.

The present disclosure also provides use of the waterborne epoxy resin of the present disclosure, and specifically, a waterborne ammonia curing agent is added to the waterborne epoxy resin to form a film for corrosion protection, where based on weight, the waterborne ammonia curing agent is 10% to 40% of the waterborne epoxy resin.

The above-mentioned waterborne ammonia curing agent may be one selected from the group consisting of ethylenediamine, hexamethylenediamine, diethylenetriamine, triethylenetetramine, and tetraethylenepentamine.

The present disclosure is further described below with reference to specific examples, but the protection scope of the present disclosure is not limited thereto. If specific techniques and reaction conditions are not indicated in the examples, procedures shall be conducted in accordance with the techniques or conditions described in literatures in the art or in accordance with the product specification. All reagents, instruments, or machines that are not labeled with a manufacturer can be obtained commercially.

Example 1

200 kg of carboxylated methoxy polyethylene glycol with a molecular weight of 200 g/mol was added to a reactor and heated to 120° C., then 202 kg of 1,4-butanediol diglycidyl ether was added to conduct a reaction for 2 h to obtain a hydroxyl-containing epoxy resin oligomer. The reactor was cooled to 80° C., then 111 kg of isophorone diisocyanate was added to conduct a reaction for 3 h to obtain a urethane-containing epoxy resin. 513 kg of deionized water was added to the urethane-containing epoxy resin (a weight ratio of the deionized water to the resin was 1:1), and a resulting mixture was stirred at 1,500 r/min for 20 min to obtain a waterborne epoxy resin emulsion with a solid content of 50%.

1,026 g of the above emulsion (which included 513 g of the urethane-containing epoxy resin) was taken, 51.3 g of ethylenediamine was added to the emulsion (the weight of ethylenediamine was 10% of the weight of the urethane-containing epoxy resin), and a resulting mixture was thoroughly stirred and poured into a mold to form a film for test.

Example 2

100 kg of carboxylated methoxy polyethylene glycol with a molecular weight of 1,000 g/mol was added to a reactor and heated to 120° C., then 34 kg of bisphenol A diglycidyl ether was added to conduct a reaction for 2 h to obtain a hydroxyl-containing epoxy resin oligomer. The reactor was cooled to 50° C., then 12.5 kg of diphenylmethane diisocyanate was added to conduct a reaction for 2 h to obtain a urethane-containing epoxy resin. 293.3 kg of deionized water was added (a weight ratio of the deionized water to the resin was 2:1) to the urethane-containing epoxy resin, and a resulting mixture was stirred at 2,000 r/min for 30 min to obtain a waterborne epoxy resin emulsion with a solid content of 33.3%.

1,000 g of the above emulsion (which included 333 g of the urethane-containing epoxy resin) was taken, 133.2 g of tetraethylenepentamine was added to the emulsion (the weight of tetraethylenepentamine was 40% of the weight of the urethane-containing epoxy resin), and a resulting mixture was thoroughly stirred and poured into a mold to form a film for test.

Example 3

500 kg of carboxylated methoxy polyethylene glycol with a molecular weight of 500 g/mol was added to a reactor and heated to 120° C., then 300 kg of poly(propylene glycol) diglycidyl ether with a molecular weight of 300 g/mol was added to conduct a reaction for 4 h to obtain a hydroxyl-containing epoxy resin oligomer. The reactor was cooled to room temperature, then 136 kg of polymeric diphenylmethane diisocyanate was added to conduct a reaction for 4 h to obtain a urethane-containing epoxy resin. 1,404 kg of deionized water was added to the urethane-containing epoxy resin (a weight ratio of the deionized water to the resin was 1.5:1), and a resulting mixture was stirred at 1,000 r/min for 10 min to obtain a waterborne epoxy resin emulsion with a solid content of 40%.

1,000 g of the above emulsion (which included 400 g of the urethane-containing epoxy resin) was taken, 80 g of diethylenetriamine was added to the emulsion (the weight of diethylenetriamine was 20% of the weight of the urethane-containing epoxy resin), and a resulting mixture was thoroughly stirred and poured into a mold to form a film for test.

Example 4

600 kg of carboxylated methoxy polyethylene glycol with a molecular weight of 600 g/mol was added to a reactor and heated to 120° C., then 174 kg of 1,6-hexanediol diglycidyl ether was added to conduct a reaction for 4 h to obtain a hydroxyl-containing epoxy resin oligomer. The reactor was cooled to 80° C., then 168 kg of hexamethylene diisocyanate trimer was added to conduct a reaction for 0.5 h to obtain a urethane-containing epoxy resin. 471 kg of deionized water was added to urethane-containing the epoxy (a weight ratio of the deionized water to the resin was 0.5:1), and a resulting mixture was stirred at 1,200 r/min for 18 min to obtain a waterborne epoxy resin with a solid content of 66.7%.

1,000 g of the above emulsion (which included 667 g of the urethane-containing epoxy resin) was taken, 200 g of triethylenetetramine was added to the emulsion (the weight of triethylenetetramine was 30% of the weight of the urethane-containing resin), and a resulting mixture was thoroughly stirred and poured into a mold to form a film for test.

Example 5

The films prepared in Examples 1 to 4 and films prepared from a commercially available waterborne polyurethane and a commercially available waterborne epoxy resin were tested for performance, and results were shown in Table 1.

TABLE 1

Performance test results

| Test item | Example 1 | Example 2 | Example 3 | Example 4 | Comparative Example 1 | Comparative Example 2 |
|---|---|---|---|---|---|---|
| Tensile strength (Mpa) | 35.6 | 39.8 | 32.4 | 41.6 | 26.8 | 30.6 |
| Impact strength (KJ/M$^2$) | 116 | 128 | 107 | 139 | 93 | 87 |
| Solid content (%) | 50 | 33.3 | 40 | 66.7 | 30 | 25 |
| Surface drying time (h) | 18 | 36 | 29 | 12 | 48 | 58 |
| Storage stability (d) | 68 | 108 | 77 | 55 | 99 | 73 |

In the table above, Comparative Example 1 represents the commercially available waterborne polyurethane resin, and Comparative Example 2 represents the commercially available waterborne epoxy resin.

Those skilled in the art may easily think of other implementation solutions of the present disclosure after considering the specification and practicing the content disclosed herein. The present disclosure is intended to cover any variation, use, or adaptive change of the present disclosure. The variation, use, or adaptive change follows the general principles of the present disclosure and includes common knowledge or conventional technical means in the technical field that are not disclosed by the present disclosure. The description and the examples are regarded as exemplary only, and the true scope and spirit of the present disclosure are indicated by the following claims.

It should be understood that the present disclosure is not limited to the content that has been described above, and various modifications and changes can be made without departing from the scope of the present disclosure. The scope of the present disclosure is defined only by the appended claims.

The invention claimed is:
1. A preparation method of a waterborne epoxy resin for an anti-corrosion coating, comprising the following steps:
    S1: performing an epoxy ring-opening reaction to an epoxy resin using carboxylated methoxy polyethylene glycol to prepare a hydroxyl-containing epoxy resin oligomer;
    S2: subjecting the hydroxyl-containing epoxy resin oligomer and an isocyanate to an end-capping reaction to obtain a urethane-containing epoxy resin; and

S3: adding deionized water to the urethane-containing epoxy resin, and stirring to obtain a waterborne epoxy resin emulsion;

wherein the epoxy resin is one selected from the group consisting of ethylene glycol diglycidyl ether, propylene glycol diglycidyl ether, 1,4-butanediol diglycidyl ether, pentanediol diglycidyl ether, 1,6-hexanediol diglycidyl ether, poly(ethylene glycol) diglycidyl ether, and poly(propylene glycol) diglycidyl ether; and, in S3, a weight ratio of the deionized water to the urethane-containing epoxy resin is (1-2):1.

2. The preparation method of a waterborne epoxy resin for an anti-corrosion coating according to claim 1, wherein the carboxylated methoxy polyethylene glycol has a molecular weight of 200 g/mol to 1,000 g/mol.

3. The preparation method of a waterborne epoxy resin for an anti-corrosion coating according to claim 1, wherein the isocyanate is one selected from the group consisting of diphenylmethane diisocyanate, polymeric diphenylmethane diisocyanate, toluene diisocyanate, isophorone diisocyanate, dicyclohexyl methane diisocyanate, hexamethylene diisocyanate, and hexamethylene diisocyanate trimer.

4. The preparation method of a waterborne epoxy resin for an anti-corrosion coating according to claim 1, wherein in S1, the ring-opening reaction is conducted at 120° C. for 2 h.

5. The preparation method of a waterborne epoxy resin for an anti-corrosion coating according to claim 1, wherein in S2, the end-capping reaction is conducted at 25° C. to 80° C. for 0.5 h to 4 h.

6. The preparation method of a waterborne epoxy resin for an anti-corrosion coating according to claim 1, wherein in S3, the stirring is conducted at 1,000 r/min to 2,000 r/min for 10 min to 30 min.

7. A waterborne epoxy resin for an anti-corrosion coating prepared by the preparation method according to claim 1.

8. A method of corrosion protection, comprising a step that a waterborne ammonia curing agent is added to the waterborne epoxy resin of claim 7 to form a film for corrosion protection; and based on weight, the waterborne ammonia curing agent is 10% to 40% of the waterborne epoxy resin.

* * * * *